(12) United States Patent
Palomba et al.

(10) Patent No.: US 10,773,695 B2
(45) Date of Patent: Sep. 15, 2020

(54) ELECTRONICALLY PRESSURE-CONTROLLABLE BRAKING SYSTEM AND METHODS FOR CONTROLLING AN ELECTRONICALLY PRESSURE-CONTROLLABLE BRAKING SYSTEM

(71) Applicant: Robert Bosch GmbH, Stuttgart (DE)

(72) Inventors: Fanny Palomba, Ingersheim (DE); Horst Beling, Heilbronn (DE); Thomas Friedrich, Ingersheim (DE); Vaclav Kocourek, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 15/982,843

(22) Filed: May 17, 2018

(65) Prior Publication Data
US 2018/0334150 A1 Nov. 22, 2018

(30) Foreign Application Priority Data

May 18, 2017 (DE) .................. 10 2017 208 351
Apr. 19, 2018 (DE) .................. 10 2018 205 957

(51) Int. Cl.
| | |
|---|---|
| B60T 8/17 | (2006.01) |
| B60T 7/12 | (2006.01) |
| B60T 8/34 | (2006.01) |
| B60T 13/18 | (2006.01) |
| B60T 13/64 | (2006.01) |

(Continued)

(52) U.S. Cl.
CPC .............. B60T 8/17 (2013.01); B60T 7/12 (2013.01); B60T 8/326 (2013.01); B60T 8/345 (2013.01); B60T 8/348 (2013.01); B60T 8/50 (2013.01); B60T 13/18 (2013.01); B60T 13/64 (2013.01); B60T 13/66 (2013.01); *B60T 2201/03* (2013.01); *B60T 2270/10* (2013.01);
(Continued)

(58) Field of Classification Search
CPC ... B60T 8/17; B60T 8/345; B60T 8/50; B60T 7/12; B60T 13/64; B60T 13/18; B60T 13/66; B60T 2270/306; B60T 2270/10; B60T 2270/20
USPC .............................. 303/9, 9.61, 119.1–119.3
See application file for complete search history.

(56) References Cited

U.S. PATENT DOCUMENTS

| | | | | |
|---|---|---|---|---|
| 3,733,817 A | * | 5/1973 | MacDuff ............... | B60T 13/162 60/405 |
| 5,634,700 A | * | 6/1997 | Decker ................. | B60T 8/1708 303/119.1 |

(Continued)

OTHER PUBLICATIONS

"Driving Stability Systems" ["Fahrstabilisierungssysteme"] by Robert Bosch GmbH, ISBN-3-10 7782-2026-8 on pp. 91 and 92.

*Primary Examiner* — Xuan Lan Nguyen
(74) *Attorney, Agent, or Firm* — Norton Rose Fulbright US LLP; Gerard Messina

(57) ABSTRACT

An electronically pressure-controllable braking system and methods for controlling an electronically pressure-controllable braking system. Each wheel brake of the braking system is connected respectively to at least two brake circuits, pump units and valve devices of one brake circuit are operable respectively independently of the pump units and the valve devices of the respective other brake circuit. This provides a cost-effectively and compactly designed redundant braking system, which is suitable for use in autonomously, i.e., driverlessly drivable, motor vehicles.

7 Claims, 4 Drawing Sheets

(51) Int. Cl.
*B60T 13/66* (2006.01)
*B60T 8/50* (2006.01)
*B60T 8/32* (2006.01)

(52) U.S. Cl.
CPC ..... *B60T 2270/20* (2013.01); *B60T 2270/306* (2013.01); *B60T 2270/413* (2013.01)

(56) References Cited

U.S. PATENT DOCUMENTS

| | | | | |
|---|---|---|---|---|
| 5,655,819 | A * | 8/1997 | Emig | B60T 8/5081 |
| | | | | 303/116.1 |
| 6,416,137 | B2 * | 7/2002 | Hofmann | B60T 7/042 |
| | | | | 303/113.2 |
| 9,555,788 | B2 * | 1/2017 | Brok | B60T 13/146 |
| 2011/0233011 | A1 * | 9/2011 | Brueggemann | B60T 8/348 |
| | | | | 188/106 P |

* cited by examiner

ELECTRONICALLY PRESSURE-CONTROLLABLE BRAKING SYSTEM AND METHODS FOR CONTROLLING AN ELECTRONICALLY PRESSURE-CONTROLLABLE BRAKING SYSTEM

CROSS REFERENCE

The present application claims the benefit under 35 U.S.C. § 119 of German Patent Application No. DE 102017208351.4 filed on May 18, 2017, and German Patent Application No. DE 102018205957.8 filed on Apr. 19, 2018, which are each expressly incorporated herein by reference in its entirety.

BACKGROUND INFORMATION

The present invention relates to an electronically pressure-controllable braking system, in particular for an autonomously driving motor vehicle, and to methods for controlling an electronically pressure-controllable braking system.

Electronically pressure-controllable braking systems of conventional motor vehicles are equipped with a pressure medium unit for setting and controlling wheel-specific brake pressures on wheel brakes, which are respectively associated with one of several brake circuits of the braking system and are connected to the pressure medium unit. For this purpose, the pressure medium unit has one electronically controllable pump unit per brake circuit and one electronically controllable valve device per connected wheel brake. The latter comprises an intake valve as well as a discharge valve, it also being possible that the two valves are combined into one valve unit. The intake valve controls an inflow of pressure medium to the associated wheel brake, while the discharge valve controls an outflow of pressure medium from the associated wheel brake. A control of the pump unit and of the valves that is adapted to the slip conditions prevailing on the wheels of the vehicle is performed by an electronic control unit, which detects and evaluates sensor signals from the vehicle for this purpose.

Depending on their scope of functions, slip-controllable braking systems in motor vehicles are also called ABS, ASR or ESP braking systems. Hydraulic circuit layouts of such vehicle braking systems are described, for example, in the brochure of the yellow series under the title "driving stability systems" ["Fahrstabilisierungssysteme"] by Robert Bosch GmbH, ISBN-3-7782-2026-8 on pages 91 and 92. Page 91 shows the hydraulic circuit diagram of a vehicle braking system having an antiblock protection control (ABS) and page 92 shows the hydraulic circuit diagram of a vehicle braking system that is comparatively further developed having a driving stability control system (ESP).

These conventional electronically pressure-controllable braking systems are designed to be controlled by a driver. This means that in the event of a fault, that is, e.g., when there are malfunctions in the vehicle network, the driver is nevertheless able to perform a braking action. This so-called mechanical or hydraulic fall-back level substantially determines the layout of vehicle braking systems of this type.

Currently, there are intense development activities in the field of autonomously, that is, driverlessly, driving motor vehicles. In autonomously driving motor vehicles, however, the attention of the passengers during the driving operation is not ensured so that an intervention of a passenger in emergency situations cannot be assumed. For this reason, all safety-relevant systems of such vehicles, that is, in particular the steering and the braking system, must be developed redundantly. Redundantly designed safety systems make it possible to operate the vehicle even in the event of the malfunction of one of the systems in a secured state so that a manual intervention of a passenger is dispensable. Compared to conventional braking systems, redundant braking systems require a markedly greater effort of construction and accordingly have a greater space requirement and moreover entail higher costs.

SUMMARY

An example electronically pressure-controllable braking system according to the present invention may have the advantage of producing a redundant braking system in a particularly compact and cost-effective manner, which is suitable for use in autonomously driving motor vehicles. The provided braking system is constructed from electrohydraulically operable components that are per se conventional using a largely known and tried and tested hydraulic layout.

Additional advantages or advantageous developments of the present invention are described herein.

A simple, preferably springlessly designed non-return valve, which is situated downstream from each intake valve associated with a wheel brake, prevents the generated brake pressure from a first pump associated with a first brake circuit from being able to dissipate in undesired fashion via a second intake valve of a second brake circuit downstream from a second pump. Braking systems of conventional, driver-controlled motor vehicles manage to do without such a non-return valve.

The pressure medium unit of the provided braking system is configurable from multiple subunits, which in turn are producible by readily implementable constructional modifications of known pressure medium units. It is therefore possible to produce and assemble the latter in already existing manufacturing plants.

Fundamentally, the utilized pressure medium units even have a simpler construction compared to the pressure medium units of conventional braking systems since in these units it is possible to dispense with a hydraulic or mechanical intervention provision for the driver in the event of a malfunction of the braking system. Apart from that, the provided braking system dispenses with a master brake cylinder and a brake pedal. A pump intake of the utilized pumps is in each instance directly connected to a pressure medium reservoir. Because there is no participation necessary on the part of a driver in a braking process, it is possible, without substitute, to dispense with valves for controlling a pressure medium connection between a master brake cylinder and a wheel brake, and it is consequently possible to implement the functionality of a driving stability control system in a pump housing of the dimensions of a pump housing of an antiblock protection control system.

The utilized subunits preferably have a mutually identical construction and are able to control braking processes even in mutual alternation. This reduces loads on the units over their service life and with an appropriately adapted design of their components results in a reduction of costs.

BRIEF DESCRIPTION OF THE DRAWINGS

Exemplary embodiments of the present invention are illustrated in the figures and are explained in detail below.

DETAILED DESCRIPTION OF EXAMPLE EMBODIMENTS

Figure 1:
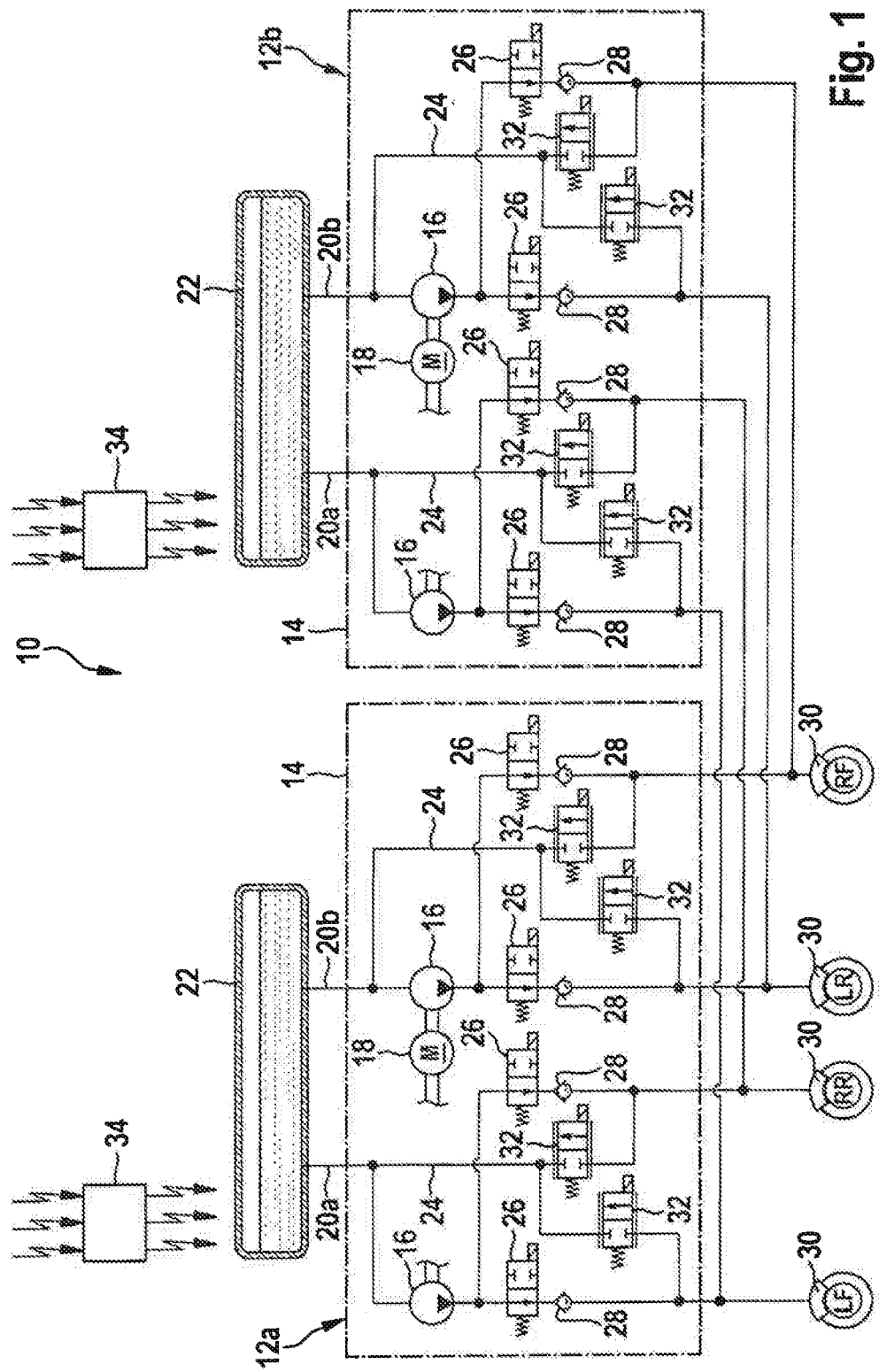
FIG. 1 shows the hydraulic circuit diagram of an electronically slip-controllable braking system according to a first exemplary embodiment of the present invention.

The electronically pressure-controllable braking system 10 is made up of a pressure medium unit 12, which is subdivided into a total of two subunits 12a, 12b. Both subunits 12a, 12b are identically constructed so that the further explanations can be limited to subunit 12a.

Subunit 12a comprises a so-called pump housing 14, which is equipped with electronically controllable, pressure medium-controlling components. Two pumps 16 shall be mentioned in this respect, which are operable by a common drive motor 18. Pumps 16 may alternatively be a single-piston pump or a multi-piston pump, or even a gear pump or the like. Each pump 16 supplies an associated brake circuit 20a, 20b with pressure medium and for this purpose is in direct connection on its intake side with an externally situated reservoir 22, which is in contact with pump housing 14, and parallel thereto with a return line 24 of brake circuit 20. A pressure side of pump 16 is connected respectively via one intake valve 26 and respectively via one non-return valve 28, connected in series to intake valve 26 in the direction of flow, to one of wheel brakes 30 of a brake circuit 20. Non-return valve 28 is preferably designed to be springless and is pervious in the direction of flow from intake valve 26 to wheel brake 30 and blocks the opposite direction as soon as the pressure level downstream from non-return valve 28 has a greater value than upstream from non-return valve 28. For each brake circuit 20, braking system 10 has a total of two wheel brakes 30 and accordingly two intake valves 26. Intake valves 26 control an influx of pressure medium into wheel brakes 30 and thus a brake pressure build-up.

Wheel brakes 30 of a brake circuit 20 are situated on diagonally opposite wheels of a vehicle; the figure accordingly showing a braking system 10 with a diagonal distribution of brake circuits 20a, 20b.

In addition to intake valves 26, one discharge valve 32 is assigned to each wheel brake 30 of brake circuit 20. The latter control a discharge of pressure medium from the associated wheel brake 30 into reservoir 22 and thus a brake pressure reduction. For this purpose, discharge valves are situated in the return line 24, which is on the one hand connected to brake circuit 20 between non-return valve 28 downstream from intake valve 26 and wheel brake 30 associated with intake valve 26 and which on the other hand leads directly to reservoir 22 or to a connector for the reservoir on pump housing 14. Discharge valves 32 are designed as proportioning control valves and may be switched from a closed basic position to a pass-through position in a plurality of intermediate positions as a function of their electronic control. By contrast, intake valves 26 are control valves that may be switched by electronic control from their normal open basic position to a blocked position without assuming stable intermediate positions in the process. This embodiment of intake valves 26 is to be seen merely as exemplary, however; it is possible to design these likewise as proportioning valves, for example if there were a higher priority to include pressure control in brake circuit 10 than to contain costs.

Each subunit 12a, 12b has respectively two brake circuits 20a, 20b that are equipped or developed in this manner. A pressure media-conducting coupling of the two subunits 12a, 12b is achieved in that respectively one of brake circuits 20a, 20b of the one subunit 12a is connected in parallel with a brake circuit 20a, 20b of the respective other subunit 12b. The respective connecting points between brake circuits 20a, 20b are located directly upstream from wheel brakes 30 of this brake circuit 20a, 20b, that is, hydraulically between the branch of return line 24 and the wheel brake 30 connected to brake circuit 20a, 20b.

According to the exemplary embodiment shown in FIG. 1, each subunit 12a, 12b has its own associated reservoir 22. It would also be conceivable, however, that both subunits 12a, 12b are supplied with pressure medium from a common reservoir 22 and to return pressure medium to a common reservoir 22.

The described vehicle braking system functions as follows:

When a braking process is initiated, drive motor 18 is controlled electronically by an electronic control unit 34 associated with subunit 12a, 12b, as a result of which drive motor 18 operates the pumps 16 associated with brake circuits 30. These take in pressure medium directly from reservoir 22 and convey the pressure medium through intake valves 26 and the downstream non-return valves 28 into the wheel brakes 30 of the respective brake circuits 20a, 20b.

Discharge valves 32 remain closed in the process so that there is a brake pressure build-up in wheel brakes 30 until a desired brake pressure level prescribed by electronic control unit 34 is reached. As soon as this brake pressure level is reached, intake valves 26 are switched into the blocking position and the activation of drive motor 18 is canceled, if indicated.

Due to the existing coupling of brake circuits 20a, 20b of the one subunit 12a with brake circuits 20a, 20b of the respective other subunit 12b, pressure medium conveyed by pumps 16 of the one subunit 12a also flows over to the respective other subunit 12b. In the process, the non-return valves 28 located downstream from intake valves 26 together with discharge valves 32 of the other subunit 12b, which are closed when without current, prevent pressure medium from being able to escape through the intake or discharge valves 26, 32 towards reservoir 22 and thus from putting the brake pressure build-up at risk.

A reduction of the brake pressure set on wheel brakes 30 is achieved by electronic control of discharge valves 32. As a function on the electronic control, discharge valves 32 open up a variably adjustable cross-sectional opening through which pressure medium is able to flow from wheel brakes 30 towards reservoir 22 and consequently a desired brake pressure adjustment may be performed in wheel brakes 30. This brake pressure adjustment may be performed as a function of changing slip conditions on the wheels of the vehicle or of changing traffic conditions and is determined or performed by respectively one electronic control unit 34 associated with subunits 12a, 12b. For a redundancy of braking system 10, it is of course necessary for each control unit 34 to be coupled to a separate voltage supply.

A braking system 10 may be controlled by a pressure medium unit made up of two subunits 12a, 12b in such a way that consecutive braking actions are controlled alternately by one subunit 12a and then by another subunits 12b.

Such an alternating operation of subunits 12a, 12b reduces their load and may accordingly be taken into account in reducing costs in the constructional design of the respective components of these subunits 12a, 12b.

It is also possible, of course, to control the braking system 10 in such a way that one of the subunits 12a controls all braking actions, while the respective other subunit 12b is activated only in the event of a malfunction of first subunit 12a.

In an operation of the described braking system 10, another operating state may occur, in which intake valves 26 are closed in one of brake circuits 20a because the required brake pressure in the associated wheel brakes 30 is already reached, while in the respective other brake circuit 20b a further build-up of the brake pressure is necessary and the intake valves 26 of this brake circuit 20b are accordingly still open. Under these circumstances there is the difficulty that due to the jointly operated pumps 16 in the one brake circuit 20a, in which the required brake pressure is already reached, regions of the circuit as well as the components situated therein would be exposed to an undesired high pressure load.

This state is to be met in that the discharge valves 32 of the already regulated brake circuit 20a are controlled in such a way that from these discharge valves 32 pressure medium flows in a throttled manner to reservoir 22, the volume of the escaping pressure medium quantity being regulated in such a way that the desired brake pressure is maintained without an increased pressure load occurring in the circuit region connected to the pressure side of the pump 16.

Figure 2:
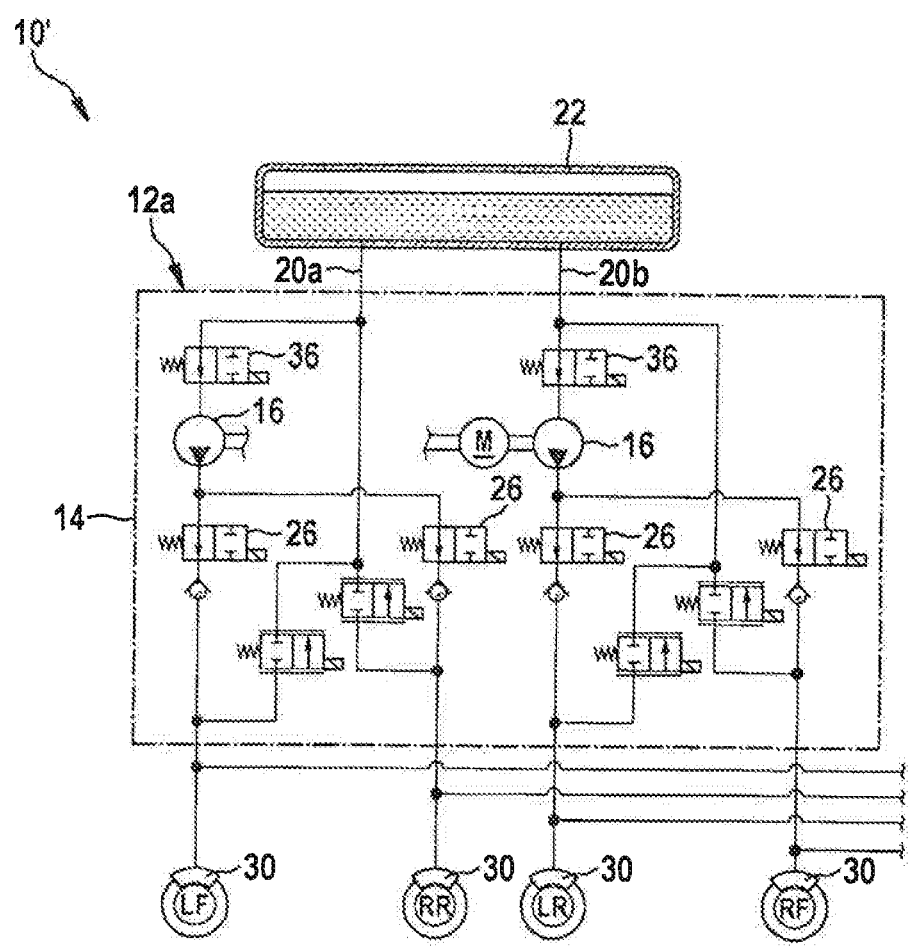
FIG. 2 shows the hydraulic circuit diagram according to a first further development of the present invention.

An alternative solution in this regard is illustrated in the exemplary embodiment shown in FIG. 2. This braking system 10' is equipped, in addition to the already explained components, with a pump suction valve 36, which is situated on the suction side of pump 16 and thereby controls the pressure medium connection of pump 16 with reservoir 22. Pump suction valve 36 is designed as a 2/2-way switching valve that is open in the currentless state and under the explained conditions it would block said pressure medium connection by electronic control in order to prevent an undesired pressure increase. Apart from the explained pump suction valve 36, the circuit layout agrees with the one from FIG. 1.

Figure 3:
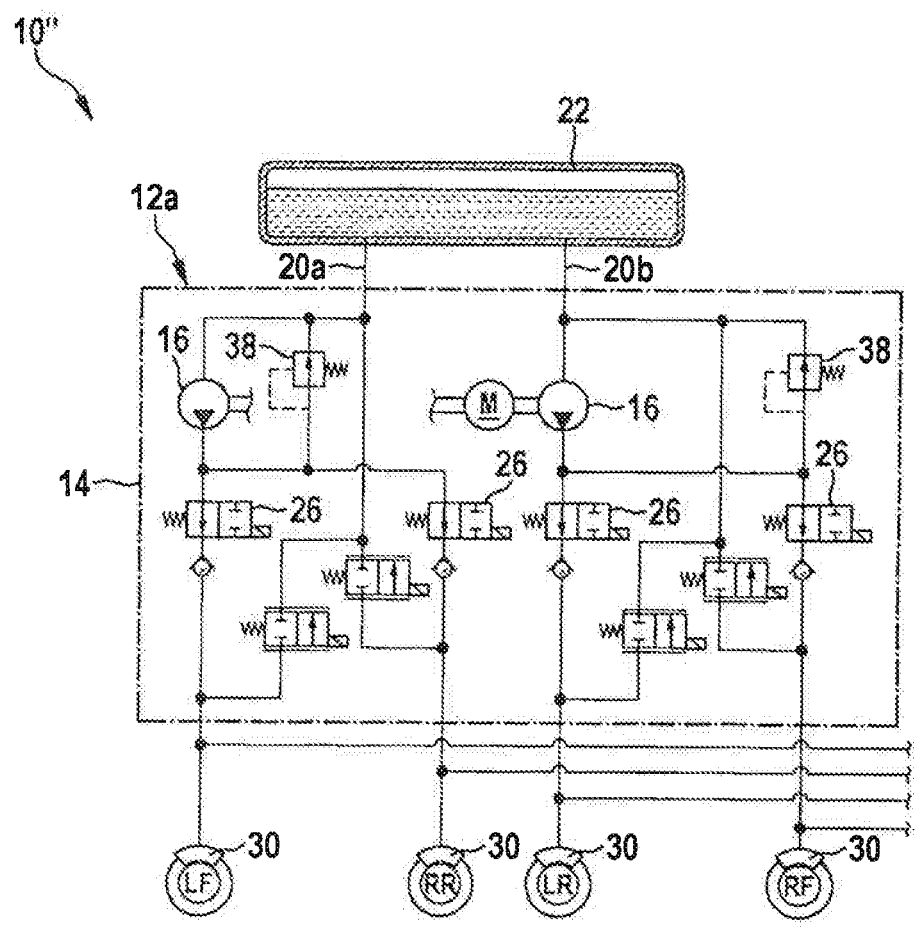
FIG. 3 shows the hydraulic circuit diagram according to a second further development of the present invention.

The exemplary embodiment as shown in FIG. 3 shows a second alternative for solving the explained problem in a braking system 10". This solution is respectively provided by a pressure-controlled pressure-limiting valve 38, which is connected parallel to the respective pumps 16 of brake circuits 20a, 20b. This pressure-limiting valve 38 switches as a function of the pressure on the pressure side of pump 16 and counter to a return force into a pass-through position, in which a pressure medium-conducting connection exists between the pressure side and the suction side of pump 16, that is, in which a hydraulic short circuit is established. As a result of this short circuit, pump 16 conveys pressure medium only in the circuit and thereby prevents an undesired pressure increase in the circuit region between the outlet of pump 16 and intake valve 26. Apart from the additional pressure-limiting valves 38, the brake circuits 20a, 20b are identically constructed to those in FIG. 1, only one of the two brake circuits 20a, 20b of a braking system 10 being shown in FIGS. 2 and 3. Incidentally, corresponding components in FIGS. 1 through 3 were provided with the same reference numerals.

Braking systems 10 as shown in FIGS. 1 through 3 are also suitable for an operating mode, in which it is necessary to displace quickly a great volume of pressure medium to at least one of wheel brakes 30 in order to brake or stop the vehicle over a short braking distance by way of a quick brake pressure build-up. One skilled in the art speaks in such a case of a braking situation of particularly high pressure build-up dynamics.

If such a necessity was determined, for example by a vehicle-side sensor system, then the two subunits 12a and 12b are jointly controlled by the respectively associated electronic control units 34 and operated simultaneously. Both subunits 12a, 12b consequently convey jointly or in parallel pressure medium under brake pressure to all four wheel brakes 30 of braking system 10. At the same time, the pressure build-up or intake valves 26 of subunits 12a, 12b are controlled in such a way that pressure medium-conducting connections are established only between respectively one of wheel brakes 30 and respectively exactly one pump 16 of braking system 10.

In contrast to a (normal) operating state, during which pump 16 of a brake circuit 20a; 20b supplies multiple or all wheel brakes 30 connected to this brake circuit 20a; 20b with pressure medium under brake pressure, in a braking situation with high pressure build-up dynamics, each wheel brake 30 is now assigned exactly only one of the total of four existing pumps 16 or each wheel brake 30 is supplied by exactly one pump 16 with pressure medium under brake pressure.

Pump 16 and associated wheel brake 30 are thereby directly connected so that the enclosed pressure medium column between the components is very short and has a high degree of stiffness. Accordingly, the brake pressure in wheel brakes 30 may be built up quickly and effectively.

Figure 4:
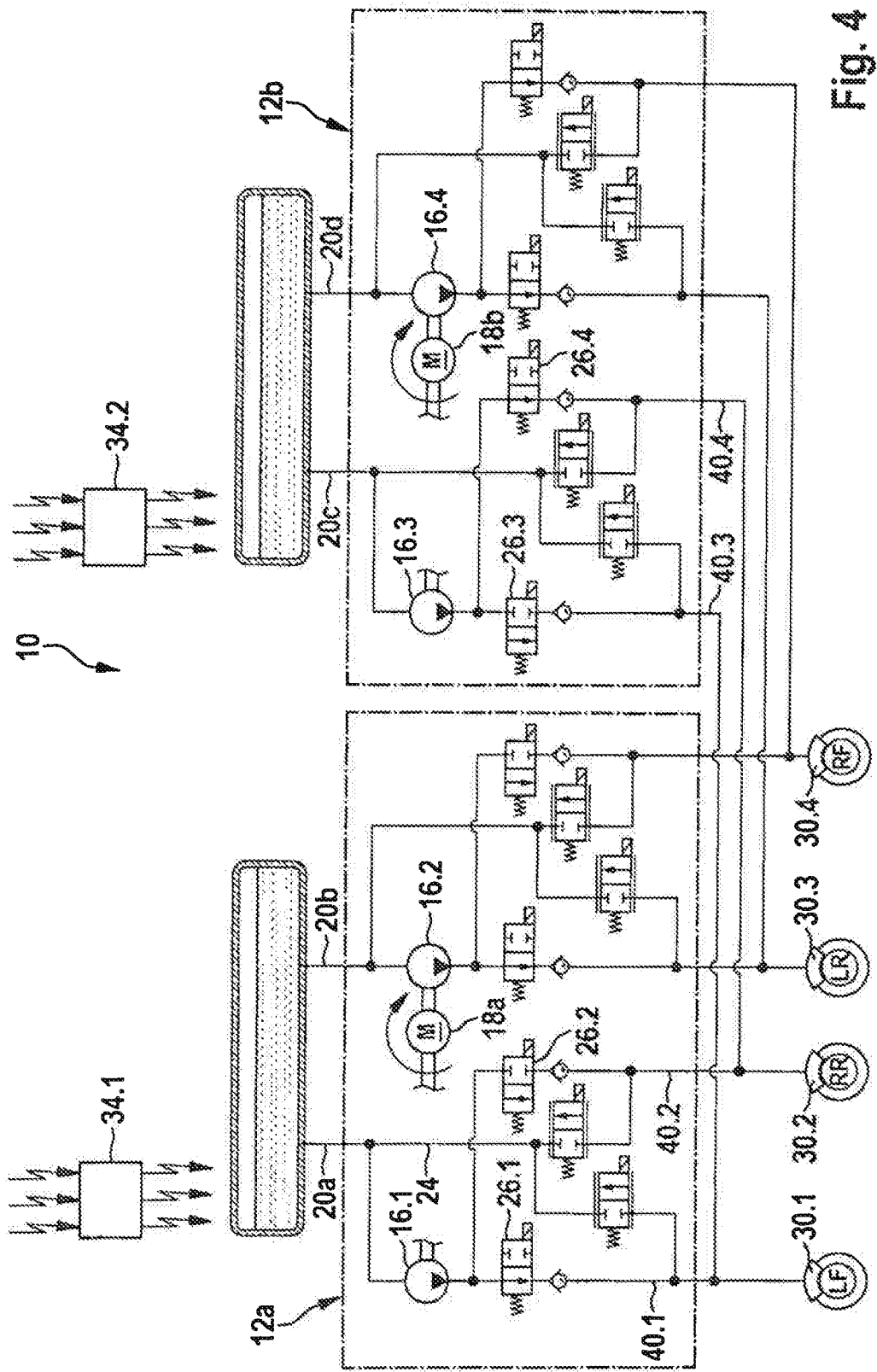
FIG. 4 shows the hydraulic circuit diagram of the braking system when the latter is in an operating state of increased pressure build-up dynamics.

The described interconnection of the pressure build-up or intake valves 26 is illustrated in FIG. 4.

According to this FIG. 4, brake circuit 20a of first subunit 12a is equipped with a pump 16.1 and branches downstream from this pump 16.1 into a first brake branch 40.1 and a second brake branch 40.2. Each of these two brake branches 40.1; 40.2 respectively contacts exactly one of a total of two wheel brakes 30.1; 30.2 of brake circuit 20a and is equipped per wheel brake 30.1, 30.2 with respectively one pressure build-up or intake valve 26.1; 26.2, which controls the pressure medium connection of this pump 16.1 with a respectively associated wheel brake 30.1; 30.2.

Pressure build-up or intake valve 26.1 of first brake branch 40.1 is in a normal position, in which the pressure medium connection between pump 16.1 and wheel brake 30.1 is open. By contrast, intake valve 26.2 in second brake branch 40.2 of first brake circuit 20.1 is controlled by electronic control unit 34.1, assumes its blocking position and thereby interrupts the pressure medium connection between pump 16.1 and second wheel brake 30.2. Accordingly, pump 16.1 of first brake circuit 20a is now connected in a pressure medium-conducting manner only with one of the two wheel brakes 30.1; 30.2.

Second wheel brake 30.2 is supplied with pressure medium via a second brake circuit 20c. This second brake circuit 20c is developed in the coordinated second subunit 12b and comprises, in addition to another second pump 16.3, also two brake branches 40.3; 40.4, which branch off downstream from this pump 16.3, as well as pressure build-up or intake valves 26.3; 26.4, which are situated in these brake branches 40.3; 40.4. Of these intake valves in turn intake valve 26.4 assumed the pass-through position, while the other intake valve 26.3 is switched to the blocking position by being electronically controlled by electronic control unit 34b. Brake branch 40.4 of second subunit 12b with intake valve 26.4 in the pass-through position is connected to second wheel brake 30.2, while brake branch 40.3 with closed intake valve 26.3 is in contact with first wheel brake 30.1. Accordingly, second pump 16.3 alone supplies second wheel brake 30.2 with pressure medium under brake pressure.

Since, according to the explained design, each of the two subunits 12a, 12b has two brake circuits 20a, 20b and 20c, 20d, respectively, it is possible to apply, in the manner described, pressure medium under brake pressure on altogether four wheel brakes 30.1 through 30.4 of braking system 10 individually via respectively exactly one associated pump 16.1 through 16.4. For driving the two pumps 16.1, 16.2 and 16.3, 16.4, respectively, of each subunit 12a; 12b, one common drive motor 18a; 18b suffices in each case. The brake circuits 20.b and 20.d of subunits 12a; 12b, which were not explicitly explained, are constructed identically to the described brake circuits 20a and 20c and supply in an equivalent manner a third wheel brake 30.3 and a fourth wheel brake 30.4, respectively, of braking system 10 with pressure medium under brake pressure.

Of course, it would be possible to reverse the explained control of the pressure build-up or intake valves 26.1, 26.2 and 26.3, 26.4, respectively, and thus to connect in a pressure medium-conducting manner the individual wheel brakes 30.1, 30.2 to the respective other brake branch 40.1, 40.2 and 40.3, 40.4, respectively, of a brake circuit 20a, 20c. It may additionally be advantageous for the driving stability of the vehicle to assign diagonally opposite wheel brakes 30.1 through 30.4 of different wheel axles to different subunits 12a; 12b.

Furthermore, additional modifications or supplements of the described exemplary embodiments are conceivable without deviating from the basic idea of the present invention.

What is claimed is:

1. An electronically pressure-controllable braking system for an autonomously driving motor vehicle, comprising:
   a pressure medium unit for setting and controlling wheel-specific brake pressures on wheel brakes, which are respectively associated with one of several brake circuits of the braking system and are connected to the pressure medium unit, the pressure medium unit being equipped per brake circuit with one electronically controllable pump unit, and per connected wheel brake, with one electronically controllable valve device which controls a pressure medium flow to the wheel brake;
   wherein each wheel brake of the braking system is connected in each case to at least one second brake circuit, which is equipped with an electronically controllable second pump unit and is equipped per connected wheel brake with one electronically controllable second valve device, the pump unit and the valve device of the one brake circuit being operable in each case independently of the pump unit and the valve device of the respective other brake circuit;
   wherein the valve device associated with one wheel brake is respectively composed of one intake valve controlling a pressure medium flow to the wheel brake and one discharge valve controlling a pressure medium discharge from the wheel brake, the discharge valves being changeable as a function of an electronic control from a blocking position in an unlimited number of intermediate positions into a pass-through position; and
   wherein downstream from the intake valves, respectively one springless non-return valve, is provided, which is pervious in a direction of flow from the valve device to wheel brake and blocks in an opposite direction of flow.

2. The electronically pressure-controllable braking system as recited in claim 1, wherein the one brake circuit and the at least one second brake circuit associated with one wheel brake are connected to one another in a pressure medium-conducting manner, the one brake circuit and the at least one second brake circuit associated with one wheel brake being respectively connected downstream from the non-return valves.

3. The electronically pressure-controllable braking system as recited in claim 1, wherein the discharge valves are respectively situated in a return line, which is directly connected to a suction connection of a pump unit and is connected in parallel to a reservoir connected to the pressure medium unit.

4. The electronically pressure-controllable braking system as recited in claim 1, wherein a first pump unit of a first brake circuit and a first pump unit of a second brake circuit are situated in a common first pump housing with a first drive motor for operating the pump units, and a second pump unit of the first brake circuit and a second pump unit of the second brake circuit are situated in a common second pump housing, constructionally separated from the first pump housing, with a second drive motor for operating the pump units.

5. The electronically pressure-controllable braking system as recited in claim 4, wherein exclusively connections for respectively externally situated wheel brakes and a reservoir are developed on each of the pump housings.

6. The electronically pressure-controllable braking system as recited in claim 1, wherein on a suction side of at least one pump unit of a brake circuit, an electronically controllable pump intake valve is provided for controlling a pressure medium supply of the at least one pump unit.

7. The electronically pressure-controllable braking system as recited in claim 1, wherein at least one pump unit of a brake circuit has a pressure limiting valve connected to it in parallel, which controls, as a function of a pressure on the pressure side of the same pump unit, a pressure medium connection from the pressure side to a suction side of the same pump unit.

* * * * *